Jan. 29, 1957  W. S. SUTOWSKI  2,779,641
BEARING CONSTRUCTION
Filed Oct. 20, 1954

INVENTOR.
WALTER S. SUTOWSKI
BY

United States Patent Office 2,779,641
Patented Jan. 29, 1957

2,779,641

BEARING CONSTRUCTION

Walter S. Sutowski, Garfield Heights, Ohio

Application October 20, 1954, Serial No. 463,473

2 Claims. (Cl. 308—196)

My invention relates to ball bearing assemblies and particularly to assemblies having a split outer race.

This application is a continuation-in-part of my pending application Serial No. 283,929 filed April 23, 1952, and now abandoned.

An object of my invention is the provision of an improved construction of a bearing assembly which is economical in construction and installation.

Another object is the provision of a ball bearing assembly which is arranged to provide for ready insertion of the ball bearings in position between inner and outer race members and for their retention in operating position.

Another object is the provision of a ball bearing assembly wherein the outer member is split and also has serrations or ridges formed upon the outer circumferential surface of the outer race member to engage the confining wall of an aperture in which the assembly is mounted.

Another object is the provision of a ball bearing assembly arranged for easy assembly of the ball bearings between the race members for insertion of the assembly into position in a supporting member, and for the proper maintenance of the assembly in mounting position.

Still another object is the provision of an improved construction of an outer race member in a ball bearing assembly which is adaptable for both radial type assemblies and for combined radial and axial thrust type assemblies.

Another object is the provision of means for anchoring to a supporting member a bearing assembly mounted within the aperture of such supporting member.

Another object is the provision of means for resisting removal of a bearing assembly from the aperture in a supporting wall member.

A further object is the provision for easy and ready insertion of a bearing assembly having a split outer race into the aperture of a supporting member and for automatically securing the assembly in the mounted position.

Other objects and a fuller understanding of my invention may be had by referring to the following description and claims, taken in conjunction with the accompanying drawing, in which:

Figure 1:
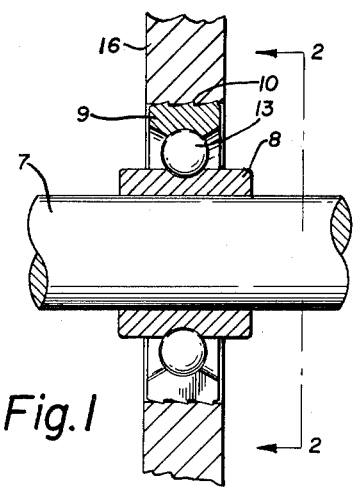
Figure 1 is a longitudinal, sectional view of an embodiment of my invention utilizing the radial thrust type of bearing assembly and is a view taken through the line 1—1 of Figure 2.
Figure 2:
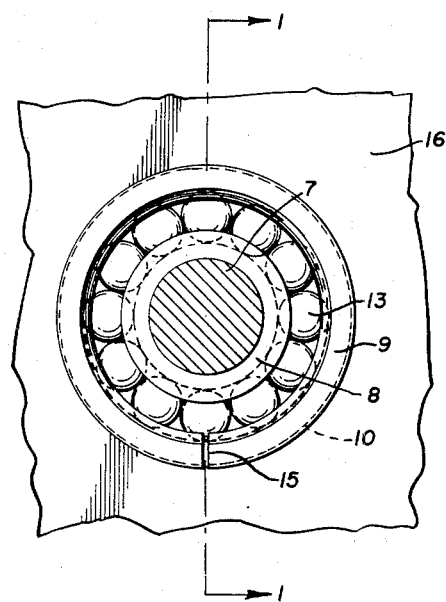
Figure 2 is a front view showing the assembly of Figure 1 and looking in the direction of the arrows 2—2 of Figure 1.

With reference to the drawing and particularly of the form shown in Figures 1 and 2, a shaft 7 has mounted thereon an inner race member 8. Positioned radially outward of the inner race member 8 is a split outer race member 9. This split outer race member is preferably made of heat-treated steel and is resilient. It has a slit 15 located at one point in its circumference. Normally and in its uncompressed condition, the outer race member 9 is expanded somewhat to have a gap at slit 15. It is also resiliently expandible to enlarge the gap to facilitate the insertion of a plurality of ball bearings 13 between the inner and outer race members. Upon insertion of the plurality of ball bearings 13 and the compression of the outer race member 9, the ball bearings 13 are arranged in a circle in a plane at right angles to the axis of the assembly.

The assembly of inner and outer race members and ball bearings therebetween is positioned in a round aperture provided in a supporting member, such as the wall 16. To mount the assembly in the aperture, the outer race member is compressed with the left-hand end shown in Figure 1 positioned over the aperture. The outer race member is then driven or pressed inwardly of the aperture, that is, toward the left in Figure 1, to where it is in the mounted position of Figures 1 and 2.

To resist removal of the assembly from the round aperture in the wall member 16, and thus to prevent accidental withdrawal of the assembly from the supporting member, I provide a plurality of serrations or ridges 10. Preferably, I provide three rows or series of these serrations or raised portions 10 on the outer circumferential surface of the outer race member 9. These serrations or ridges 10 are in the form of circles extending around the circumference of the outer race member, the several serrations or ridges being spaced from each other in an axial direction.

The serrations or ridges 10 have sides or surfaces raised up from the outer circumference of the race member 9 which meet at a peak or sharp edge. As better shown in detail in Figure 4, the sides of each serration 10 are unequal in that one side of each ridge is long and on a gradual slope or taper, whereas the opposite side is abrupt and substantially at right angles to the axis of the assembly. It is to be noted that the gradually sloping sides of each ridge or serration is on the side first meeting the wall member 16 upon insertion of the assembly into the aperture of the wall member, that is, toward the left in Figure 1. The resilient compressibility of the outer race member is such that the outer race member "gives" and presses radially inward upon insertion of the assembly into the aperture of the wall member. However, the outer race member 9 is also resiliently expandible so as to exert a radially outward force against the confining wall of the aperture in the wall member. This expanding force tends to press the serrations 10 hard outwardly against the inner wall of the aperture and thus to dig into the material of the wall member. The abrupt or right-angle sides of the serrations 10 are so disposed that they do not readily slide or cammingly engage the inner wall surfaces of the aperture as would the gradually sloping sides but, on the contrary, tend to frictionally engage the inner wall of the aperture and to thus resist removal of the outer race from the aperture.

To facilitate the insertion of the assembly into the aperture of the supporting member 16, I provide a slight taper or inward slope to the inner wall of the aperture. This slight inward taper of the defining wall aids in inserting the assembly into position, while the serrations thus above described resist removal of the assembly, that is, movement of the assembly to the right in Figure 1.

Preferably, there is also a corresponding slight taper to the general outer wall of the outer race 9, which taper generally corresponds with the slight taper of the inner defining wall of the aperture in the member 16. This slight taper on the outer surface of the outer race member 9 is along a line defining the root or minimum diameter of the race member 9. As the serrations 10 are of uniform height or radial extent, then the peaks or high points of the serrations are also on the same general tapered line and thus also correspond to the taper of the inner defining wall of the aperture in the member 16.

Figure 3:
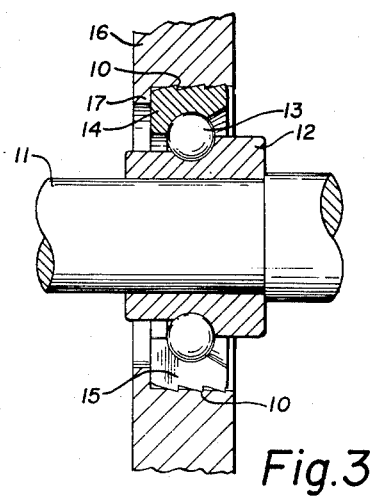
Figure 3 is a view somewhat similar to that of Figure 1 but showing a modified form of the bearing assembly, which is of the type to provide for combined radial and axial thrust upon the bearing assembly.

In Figure 3, I show a modified form of the arrangement shown in Figure 1, but which include the features of the serrations 10 on the outer circumferential surface of the outer race member. The bearing assembly illustrated in Figure 3 is of the type adapted to best receive both radial and axial thrust upon the bearing assembly.

A shaft 11 has a shoulder thereon which is arranged to provide an axial thrust to the left in Figure 3 as well as a radial thrust. Mounted upon the shaft 11 is an inner race member 12 in a manner to abut the shoulder on the shaft. Positioned radially outward of the inner race member 12 and spaced therefrom is an outer race member 14.

The opposed curved surfaces of the inner race member 12 and the outer race member 14 are arranged to provide for more axial thrust in one direction, that is, toward the left in Figure 3, than in an opposite direction. A plurality of ball bearings 13 are arranged in a circle between the inner and outer race members in the usual manner.

The outer race member is resilient and is preferably made of heat-treated steel. It is split to have a slit 15 at one location in its circumference. In its normal uncompressed condition, the slit 15 is somewhat enlarged to provide a gap, but in the compressed condition this slit 15 is closed to provide a substantially continuous bearing surface for the balls 13. The outer race member is also somewhat expandible from the normal uncompressed condition to facilitate the insertion of the balls 13 into proper position between the inner and outer race members.

The outer race member also has shown thereon three circular serrations or raised peaks 10, somewhat like those shown in Figure 1. These serrations or peaks provide the same function of resisting withdrawal of the assembly from an aperture in supporting member or wall 16, as described in connection with Figure 1.

Figure 4:
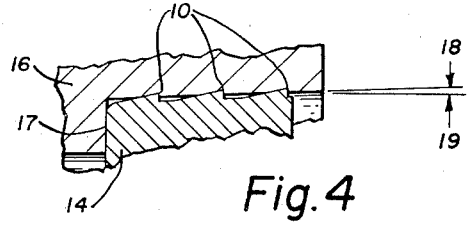
Figure 4 is an enlarged sectional view showing details of the engagement of the outer race member within the aperture of a supporting member.

In the arrangement of Figure 3, the wall member 16 has an inner shoulder 17 at one end of the aperture. This inner shoulder 17 resists axial thrust in a direction to the left in Figure 3 to help maintain the assembly in the position shown in Figure 3. Also in the form shown in Figure 3, there is a slight taper to the inner wall of the aperture receiving the assembly, as described in connection with the form shown in Figure 1. To illustrate this taper, I show in Figure 4 an extended line 18 which is an extension of the taper of the defining wall of the aperture. The line 19 in Figure 4 represents an extension of a line which is parallel to the axis of the assembly. The angle between the lines 18 and 19 in Figure 4 represents the slight inward taper of the defining walls of the aperture in the supporting wall member 16.

In Figure 4, there is shown the manner in which the serrations 10 engage the defining wall of the aperture in which the outer race member 14 is positioned. The penetration of the serrations 10 in the material of the wall member is slightly exaggerated to better illustrate the function of serrations 10 in resisting withdrawal of the outer race member 14 from the aperture, that is, to the right in Figure 4. As in the description of the function of the serrations in connection with the form shown in Figure 1, the outward resilient bias of the outer race member 14 tends to urge the serrations radially outward in tight engagement with the walls of the aperture and thus in good frictional engagement therewith.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a bearing unit having a plurality of bearings and inner and outer races engaging said bearings arranged in a circular path, the improvement of a split resiliently compressible outer race having an outer peripheral surface, said outer peripheral surface having a minimum circumference upon the compression of the outer race closing said split, said outer race being resiliently biased to expand outwardly to widen said split, said outer peripheral surface having a larger circumference than said minimum circumference in the expanded condition of said outer race, said outer race having a plurality of axially spaced and circumferentially extending ridges disposed on said outer peripheral surface and forming a plurality of peaked portions extending radially outward of said outer race, the opposite axially disposed sides of each of the peaked portions being angularly disposed to each other, the sides toward one axial end being on a gradual incline and the sides toward the other axial end being abrupt, relative to each other, said bearing unit being insertable in the round aperture of an apertured supporting member, said aperture having a circumference less than the said larger circumference of the outer race in expanded condition whereby the outer race is compressed upon insertion in the aperture to close said split by the confinement of the walls of said aperture and the outer peripheral surface of the outer race assumes said minimum circumference, said gradually inclined sides of the peaked portions providing a sliding engagement with the walls of said aperture upon insertion of the said unit in one direction into the aperture and the abrupt sides of the peaked portions meeting said aperture walls to resist axial withdrawal of the unit in an opposite direction from the aperture, said resilient bias of the outer race retaining the engagement of said peaked portions with said walls to lock the unit within said aperture.

2. In a bearing unit having a plurality of bearings and inner and outer races engaging said bearings arranged in a circular path, the improvement of a split resiliently compressible outer race having an outer peripheral surface, said outer peripheral surface having a minimum circumference upon the compression of the outer race closing said split, said outer race being resiliently biased to expand outwardly to widen said split, said outer peripheral surface having a larger circumference than said minimum circumference in the expanded condition of said outer race, said outer race having a plurality of axially spaced and circumferentially extending ridges disposed on said outer peripheral surface, each rib having a sharp summit extending therealong, said bearing unit being insertable in the round aperture provided in a supporting member, said aperture having a circumference less than the said larger circumference of the outer race in expanded condition whereby the outer race is compressed upon insertion in the aperture to close said split by the confinement of the walls of said aperture and the outer peripheral surface of the outer race assumes said minimum circumference, said supporting member having means for opposing axial displacement from said aperture in one axial direction, said ridges being resiliently urged outwardly by said resilient bias of the outer race against the aperture walls to dig into said aperture walls to resist axial displacement of the outer race from the aperture in an opposite axial direction.

References Cited in the file of this patent

UNITED STATES PATENTS

| | | |
|---|---|---|
| 1,281,786 | Kellow | Oct. 15, 1918 |
| 1,452,603 | Himes | Apr. 24, 1923 |
| 2,333,400 | Ware | Nov. 2, 1943 |
| 2,648,578 | Stearns et al. | Aug. 11, 1953 |

FOREIGN PATENTS

| | | |
|---|---|---|
| 158,046 | Germany | Feb. 6, 1905 |